(12) United States Patent
Shapira et al.

(10) Patent No.: US 11,030,841 B2
(45) Date of Patent: Jun. 8, 2021

(54) DECENTRALIZED TALENT DISCOVERY VIA BLOCKCHAIN

(71) Applicant: EscapeX Limited, Kwun Tong (HK)

(72) Inventors: Sephi Joseph Shapira, Ramot Hasavim (IL); Cho-Hsuan Lee, Taipei (TW)

(73) Assignee: ESCAPEX LIMITED, Kwun Tong (HK)

( * ) Notice: Subject to any disclaimer, the term of this patent is extended or adjusted under 35 U.S.C. 154(b) by 0 days.

(21) Appl. No.: 16/553,888

(22) Filed: Aug. 28, 2019

(65) Prior Publication Data

US 2020/0074778 A1 Mar. 5, 2020

Related U.S. Application Data

(60) Provisional application No. 62/723,564, filed on Aug. 28, 2018.

(51) Int. Cl.
*G07C 13/00* (2006.01)
*H04L 9/32* (2006.01)
*H04L 9/06* (2006.01)

(52) U.S. Cl.
CPC ............ *G07C 13/00* (2013.01); *H04L 9/0637* (2013.01); *H04L 9/3213* (2013.01)

(58) Field of Classification Search
CPC ............... G07C 13/00; H04L 2209/38; H04L 2209/463; H04L 9/0637; H04L 9/3213; H04L 9/3239; H04L 9/3247
See application file for complete search history.

(56) References Cited

U.S. PATENT DOCUMENTS

| | | | |
|---|---|---|---|
| 2018/0075393 A1* | 3/2018 | Lovell | G06Q 50/01 |
| 2018/0158162 A1* | 6/2018 | Ramasamy | G06Q 20/3827 |
| 2018/0197172 A1* | 7/2018 | Coburn | A63F 13/792 |
| 2019/0238525 A1* | 8/2019 | Padmanabhan | H04L 63/0428 |
| 2019/0318338 A1* | 10/2019 | Verma | H04L 9/0637 |
| 2020/0074778 A1* | 3/2020 | Shapira | H04L 9/3213 |
| 2020/0134656 A1* | 4/2020 | Padmanabhan | H04L 63/0815 |
| 2020/0250295 A1* | 8/2020 | Padmanabhan | H04L 63/102 |

* cited by examiner

*Primary Examiner* — Thien M Le (74) *Attorney, Agent, or Firm* — Mannava & Kang, P.C.; Hean L. Koo (57) ABSTRACT

Improved blockchain technology includes a decentralized talent discovery protocol. The decentralized talent discovery protocol may run a talent contest using self-executing smart contracts for voting parameters, crypto-tokens to facilitate democratization of the contest, and a decentralized ledger for immutably storing a record of voting events. The smart contracts may automatically execute code that enforces agreed-upon rules for voting and compensation for various parties. The decentralized ledger may provide immutable and secure proof of voting and compensation rights. To vote for a performer during the talent contest, a voting user may provide crypto-tokens issued by the system in exchange for a vote or the crypto-tokens themselves may be pledged to a performer. The crypto-tokens obtained through voting may be distributed according to the smart contract. The outcome of the talent contest may be determined by the number of votes and/or amount of cryptocurrency pledged to the performer.

20 Claims, 6 Drawing Sheets

DECENTRALIZED TALENT DISCOVERY VIA BLOCKCHAIN

RELATED APPLICATIONS

This application claims priority to U.S. Provisional Patent Application Ser. No. 62/723,564, filed Aug. 28, 2018, which is hereby incorporated by reference in its entirety.

FIELD OF THE INVENTION

The disclosure relates to improved blockchain technology that includes a decentralized talent discovery protocol for a talent discovery event using self-executing smart contracts for voting parameters, crypto-tokens to facilitate democratization and decentralization of the contest, and a decentralized ledger for immutably storing a record of voting events.

BACKGROUND

Blockchain and distributed ledger technology ("DLT") has grown in popularity due to its promise of secure and decentralized data storage and transactions, among other benefits. Various applications of blockchain and DLT to different industries is growing at a rapid pace. One area in which blockchain and DLT may be improved upon and applied is for talent discovery. Currently, tracking votes and awarding a winner in a talent contest can be a cumbersome and opaque process, and also fails to properly incentivize and track voters who voted for their favorite contestants.

DETAILED DESCRIPTION OF THE INVENTION

The disclosure relates to improved blockchain technology that includes a decentralized talent discovery protocol. The decentralized talent discovery protocol may run a talent discovery event ("talent contest") using self-executing smart contracts for voting parameters, crypto-tokens to facilitate democratization of the contest, and a decentralized ledger for immutably storing a record of voting events.

The smart contracts include automatically executed code that enforces agreed-upon rules for voting and compensation for contestants, judges, voters, and others involved. The decentralized ledger may provide immutable and secure proof of voting and compensation rights derived from the talent contest. To vote for a performer during the talent contest, a voting user must provide some unit of value (such as crypto-tokens issued by the system) in exchange for a vote or the crypto-tokens themselves may be pledged to a performer. The crypto-tokens obtained through voting may be distributed according to the smart contract. For example, the smart contract may disperse the total value of the crypto-tokens derived from voting to a prize pool, funds for the performer, funds for the voter, funds for a judge, funds for the system, and/or other recipient.

The outcome of the talent contest may be determined by the number of votes and/or amount of cryptocurrency pledged to the performer. As an incentive to the voter, the smart contract may automatically disperse a portion of the winnings of the performer to the voter. In some instances, the smart contract may disperse a portion of the performer's future earnings (e.g., album sales for a singer) to the voter. One or more promoters may promote the talent contest through the blockchain based system and may be awarded a portion of the winnings and/or other reward, such as future earnings. As such, the decentralized talent discovery protocol may properly incent all parties involved, from contestants to get discovered, judges to mediate events that are popular (drive votes), and voters to vote for their favorite contestants but also share in potential earnings of the contestants they support.

In some instances, legacy voting systems, such as those using text messages or phone calls for conventional televised talent contests, may be used to obtain votes. In some of these instances, the votes may be simply tallied to help determine a winner or may be converted to blockchain based votes disclosed herein for recordation on the decentralized ledger. In this manner, a hybrid voting system may be adopted, one in which uses the blockchain based voting disclosed herein and incorporating legacy voting (e.g., via telephone or SMS text message).

The decentralized talent discovery protocol may be executed within an application infrastructure built around individual control of user data. In this context, the decentralized talent discovery protocol enables talent discovery as a service, since individual users may judge a talent contest.

Figure 1:
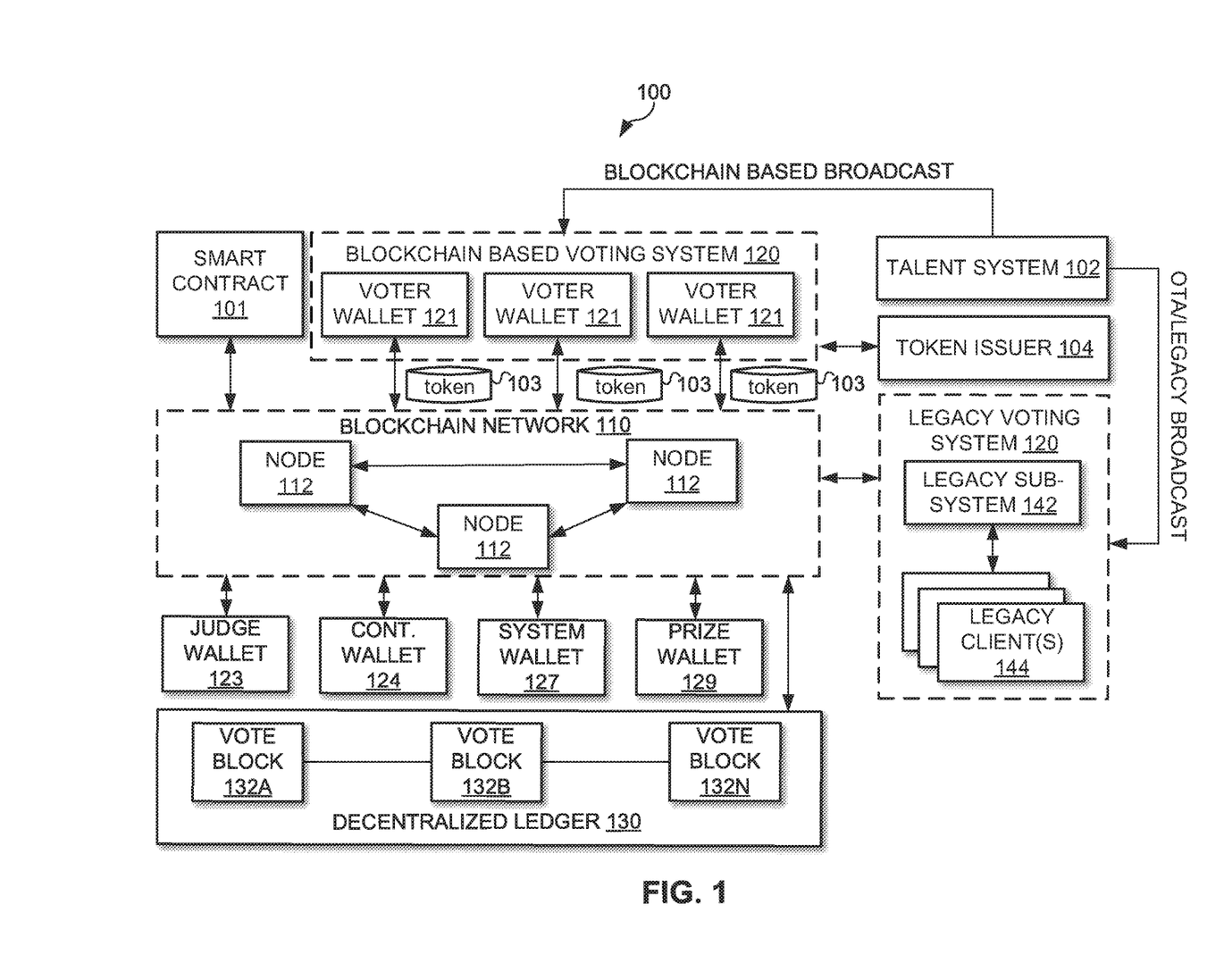
FIG. 1 illustrates an example of a system that implements a decentralized talent discovery protocol using blockchain technology, according to an implementation of the invention.

FIG. 1 illustrates an example of a system 100 that implements a decentralized talent discovery protocol using blockchain technology, according to an implementation of the invention. The decentralized talent discovery protocol may include a smart contract 101 that democratizes and decentralizes talent discovery. For example, the smart contract 101 may encode self-executing code that is used to run a talent discovery event ("talent contest") in which various parties are incentivized to participate. For example, one or more judges may organize talent contests to draw contestants to participate and voters to vote on the contestants. The system may assign each of these parties with a blockchain wallet.

The system 100 may include a talent system 102, a token issuer 104, a blockchain network 110, a blockchain based voting system 120, a decentralized ledger 130, a legacy voting system 140, and/or other components.

Figure 2:
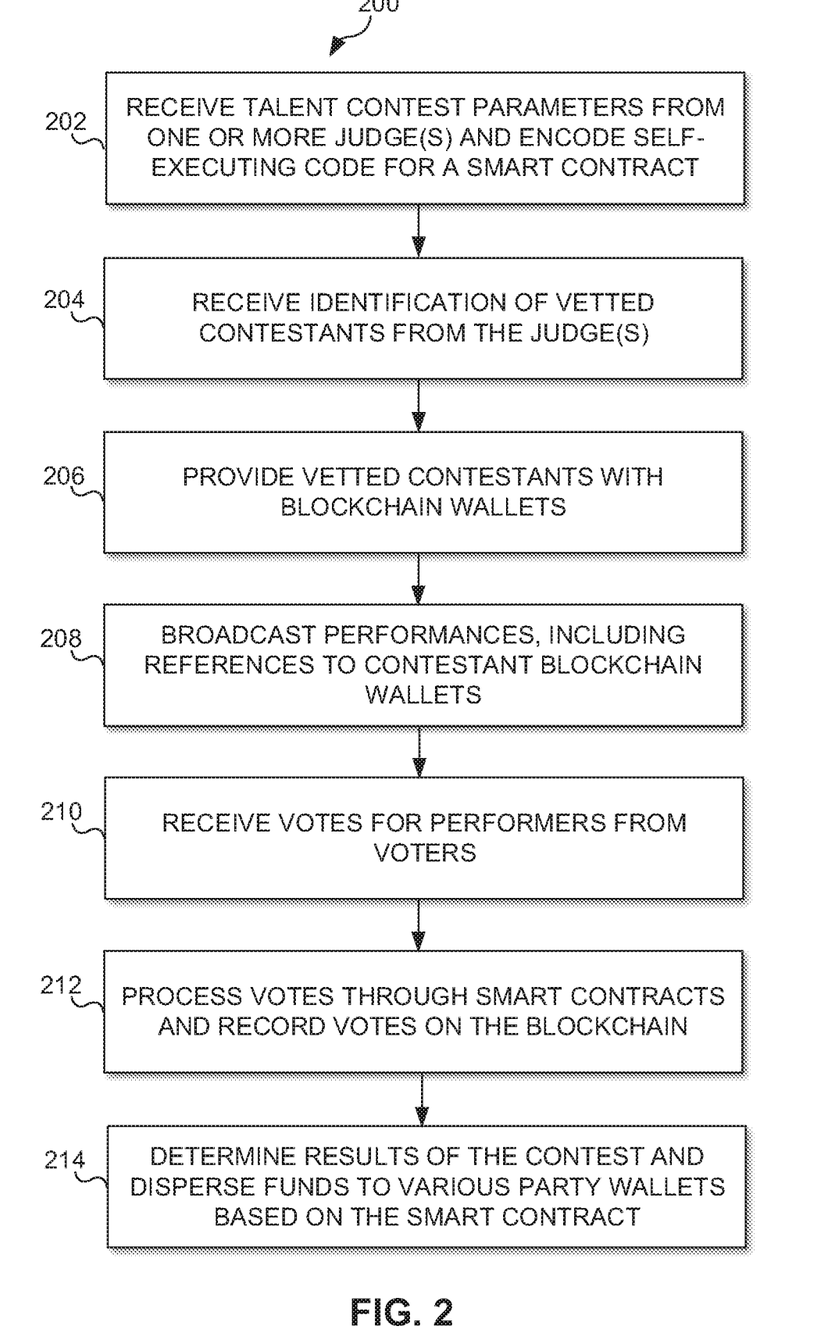
FIG. 2 illustrates an example of a process for decentralized talent discovery using blockchain technology, according to an implementation of the disclosure.

FIG. 2 illustrates an example of a process 200 for decentralized talent discovery using blockchain technology, according to an implementation of the disclosure.

In an operation 202, process 200 may include receiving contest parameters from one or more users who serve as judges and organize/setup talent contests. In this manner, talent contests are further decentralized since a given user may organize a talent contest disclosed herein. The contest parameters may include, for example, compensation information, starting and stopping information, contest type, and/or other parameters for running the talent contest. The compensation information may include an indication of compensation to be provided to contestants, judges, voters, and/or other parties, and the conditions under which such compensation occurs. The starting information may indicate when the talent contest is to start and the stopping information may indicate when the talent contest is to end (e.g., termination triggers). The contest type may indicate what type of performances (such as singing, cooking, etc.) (or variety of types of performances) are to be showcased in the talent contest. Some or all of the contest parameters may include default values set by the system. Process 200 may further include encoding self-executing code based on the contest parameters.

Typically, though not necessarily, a judge is a celebrity or other user with a large following that will draw interest from other users to view and vote on the contest. As an incentive for organizing and garnering a large participation of voters, judges may be provided with a portion of any prize, a pro rata future interest in performers (whether or not the performers win) (proportional to the number of votes or tokens 103 pledged), and/or other incentive. As used herein, the term "pledged" means that a number or value of tokens 103 was committed as a way to indicate the voter's belief or desire for the performer to win, not that the entire amount/number of pledged tokens 103 will be provided to the performer. These and other incentives may be automatically provided to the judge, such as through the judge's wallet 123. The system may generate a contest identifier to identify the talent contest created or otherwise specified in operation 202.

In an operation 204, process 200 may include receiving an identification of vetted contestants from the judges. In some, but not necessarily all, instances, the judge may screen contestants who audition for the contest. For example, upon creating a contest, the judge may advertise to her followers that the contest is to be conducted and one or more of the contest parameters. Contestants may "audition" to be added to the talent contest. For example, the talent system 102 may receive auditions that are directed to the contest (which was registered by the judge). The talent system 102 may forward the auditions to the judge for vetting. The judge may indicate to the talent system 102 which ones of the contestants have been vetted and should be contestants. It should be noted that users other than the judge may screen the contestants as well or instead of the judges.

In an operation 206, process 200 may include providing each of the vetted contestants with a contestant wallet 125 (if they do not already have such a wallet). Each contestant's public key may be associated with a name of the contestant so that voters can easily identify that contestant. However, the system may identify the contestant based on the contestant's public key. Thus, the talent system 102 may store an association of the name of the contestant and the public key. Because multiple talent contests may simultaneously take place (or at least overlap in duration), each contestant may be associated with a particular talent contest. For example, the talent system 102 may store an association between the contest identifier and the public key of the contestant's wallet 125 to indicate that the contestant is competing in the talent contest identified by the contest identifier. It should be noted that a contestant may participate in multiple contests. In these instances, the contestant's public key may be stored in association with multiple contest identifiers.

In an operation 208, process 200 may include broadcasting performances of the performers, including references to performers' blockchain wallets. For example, for the blockchain based voting system 120, the performance may be broadcast to voters via a contest interface, such as one illustrated in FIGS. 5-7. The contest interface may specify the contestant identifier and the contest identifier so that any votes received from a voter may be encoded with the contestant identifier and the contest identifier to target the appropriate smart contract 101 for instances where multiple talent contests (each with a respective smart contract 101) are run simultaneously. For the legacy based voting system 140, the performance may be broadcast via television or other conventional talent contest systems. It should be noted, however, that the blockchain based voting and the legacy based voting may use any broadcast medium, so long as the votes for the medium may be processed as disclosed herein.

In an operation 210, process 200 may include receiving votes for performers from voters. For example, the blockchain based voting system 120, the blockchain network 110 may receive a blockchain transaction from a voter wallet 121. The voter wallet 121 may generate the blockchain transaction to include one or more messages that specify the vote, such as an identity of the performer and identity of the talent contest. The blockchain transaction may be broadcast from the voter wallet 121 to one or more nodes 112 of the blockchain network 110, such as using a peer-to-peer communication protocol. For implementations in which a vote requires transfer of token(s) 103, the transaction may specify a number of tokens 103 to pay for the vote or otherwise pledge a number of tokens 103 for a performer. The transaction may further specify a recipient wallet. The recipient wallet may be the system wallet 127 and/or other wallets. If the system wallet 127 is specified, then tokens 103 or other value may be added to the system 127, from which the appropriate funds will be distributed (e.g., to the winning performers, to the voters that voted on the winning performers, the system (e.g., the system operator), the judges, etc., under the smart contract 101) at the conclusion of the talent contest.

In an operation 212, process 200 may include processing the votes through the smart contract 101 and recording the votes on the decentralized ledger 130. For example, the nodes 112 may validate the transaction (e.g., by ensuring that the signing voter actually signed the transaction). Validated transactions may be added (by various nodes 112) to the decentralized ledger 130 and a consensus decision is reached as to the current state of the ledger, upon which the transaction is recorded on the blockchain. Part of the validation may include consulting the smart contract 101 associated with the corresponding contest (e.g., based on the contest identifier) to ensure that the appropriate dispersals to appropriate wallets are or will be automatically made.

In an operation 214, process 200 may include determining results of the contest and dispersing funds to various parties' wallets based on the results and the smart contract 101. To do so, the system may identify a content termination condition, which may be specified in the smart contract. For example, the smart contract 101 may specify that the contest terminate at a specified date and time, at a specified duration after the start of the contest, a number of contestants having competed, and/or other contest terminating condition. Upon processing a transaction, the nodes 112 may assess whether the contest should be terminated. Alternatively or additionally, the judges may broadcast an indication via the judge wallet 125 that the contest should be terminated. Upon termination, the system may tally the votes (and/or tokens 103 spent/pledged) for each contestant and determine a winner. For example, the smart contract 101 may include code that tallies the votes (which may be stored off the blockchain) and that automatically disperses the winnings according.

Smart Contract

Smart contracts 101 may include self-executing computer code that includes the operational terms of an agreement, between two or more parties, where the terms are written into and executed by the lines of code. The code can be stored across the blockchain network 110. Smart contracts 101 can automatically receive data from various sources (such as voting system computers, voters, judges, etc.) and programmatically implement a series of "if-then" rules with little or no human interaction.

Tokens 103

Tokens 103 may include digital currency that uses cryptography for security and for which transactions are typically recorded to a blockchain. Tokens 103 may be a digital currency, but can be programmed to include additional functionality, such as a future interest described herein. Recordation of ownership of the token 103 may be via the decentralized ledger 130. Typically this is implemented using public key/private key encryption. In some instances, the token 103 may be bought and sold (or traded) via exchanges and can be transferred in a peer-to peer manner. As such, the blockchain network 110 facilitates an economy around the token 103. Transfers may occur via wallets (121, 123, 125, 127, 129) which is associated with a user or device, has a unique alphanumeric identifier and can transfer and receive crypto currencies and tokens.

Blockchain Based Broadcasting

Figure 5:
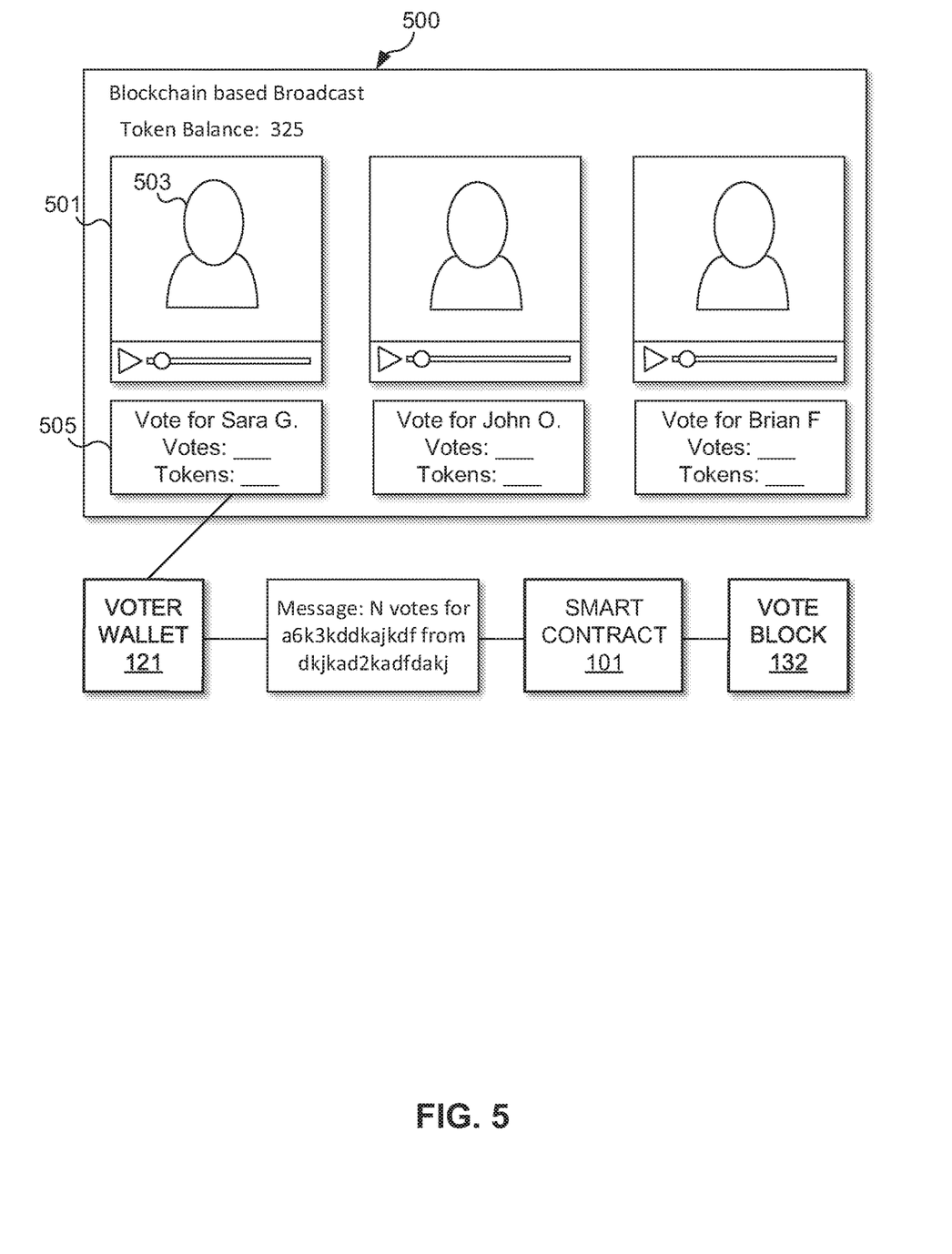
FIG. 5 illustrates an example of a contest interface for viewing and voting for a performer in a blockchain based voting system, according to an implementation of the invention.
Figure 6:
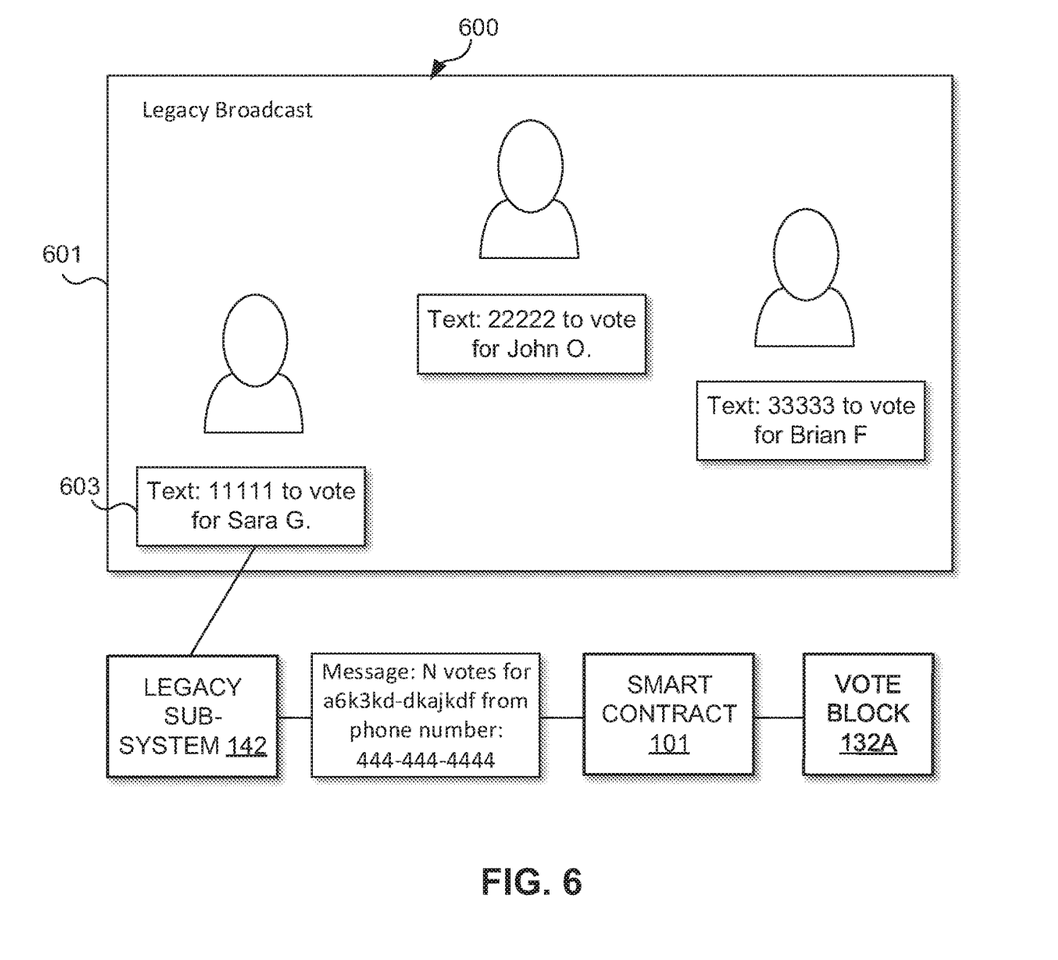
FIG. 6 illustrates an example of a contest interface for viewing and voting for a performer in a legacy based voting system, according to an implementation of the invention.
Figure 7:
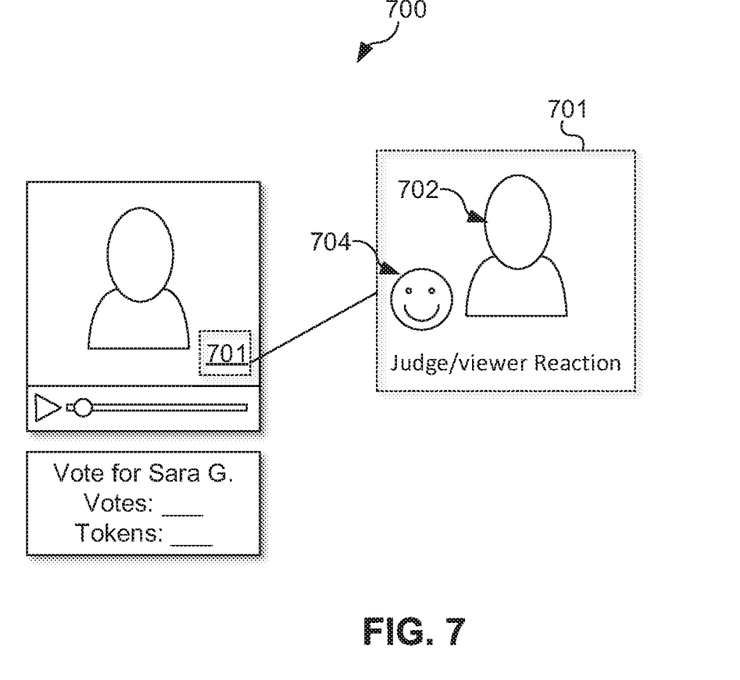
FIG. 7 illustrates an example of a contest interface for viewing and voting for a performer augmented with judge or other user reactions and automated sentiment analysis, according to an implementation of the invention.

The blockchain based voting system 120 may broadcast the talent contest to voters through their respective devices. For instance, the voter wallet 121 may include or be associated with an contest interface that displays performances by the performers. Each performance may be provided to the contest interface, where the voter can view and vote on the performance. An example of a contest interface is illustrated in FIGS. 5-7.

The decentralized ledger 130 may include a series of blocks of data 132A-N that that are chained together. For example, each block 132 may be identified by a hash. Each block 132 may include a reference to a previous block's hash. In this manner, the blocks of data may be chained together. An example of a decentralized ledger is described in the well-known white paper "Bitcoin: A Peer-to-Peer Electronic Cash System," by Satoshi Nakamoto (bitcoin.org), the contents of which are incorporated by reference in its entirety herein. Other blockchain platform technologies may be used as well, such as the Ethereum platform, described in the white paper, "Ethereum Specification" (https://github.com/ethereum/wiki/wiki/White-Paper), the contents of which are incorporated by reference in its entirety herein. It should be noted that the foregoing examples of decentralized ledgers do not include various features disclosed herein that facilitate decentralized talent discovery and are used as examples of distributed ledgers.

Full or partial copies of the decentralized ledger 130 may be stored on a peer-to-peer network such as the blockchain network 110, whose nodes 112 each runs a blockchain agent (such as blockchain software) to access the decentralized ledger 130 and communicate with one another. In some instances, users of the system may be provided with blockchain agents for execution at their devices. For instance, various users or system components may be assigned with a blockchain wallet application (illustrated as voter wallets 121 issued to voters, judge wallets 123 issued to judges, cont. wallets 125 issued to contestants, system wallet 127 for the system, and a prize wallet 129 for holding prizes). Each wallet may hold a value of crypto-tokens (illustrated as "tokens 103").

To hold tokens 103, each wallet may be assigned with a public key and a private key. The private key may be held in secret by each wallet while the public key may publicly available to identify the corresponding wallet. The public key may be used to identify tokens 103 held by a user that holds the corresponding private key. A given wallet may "hold" tokens 103 based on an association of the tokens 103 with the wallet's public key recorded on the decentralized ledger 130.

All or portion of the crypto-tokens value may be transferred between wallets by generating a blockchain transaction that identifies a recipient's public key and a transfer amount. The sending user may digitally sign the transaction with the sender's private key. Transactions may be relayed to various nodes 112 in the blockchain network 110 in a peer-to-peer manner. The blockchain network 110 may verify the transaction by using the sender's public key to verify that the sender actually signed the transaction, that the sender has sufficient tokens 103, and the tokens 103 haven't been double-spent. Other consensus validation processing may be performed as well. Once validated, the transaction may be accepted by consensus and written to a block 132, which is added to the decentralized ledger 130. The transaction may be grouped with other transactions into a single block 132. For Proof-of-Work implementations, the transaction(s) may be hashed together with a nonce and the hash of the previous block 132 until a hash value below a threshold value is found (as set by the blockchain network 110). Various nodes 112 may compete to add blocks 132 to the decentralized ledger 130. As a reward for doing so, operators of nodes 112 may be provided with a reward in the form of a transaction fee. For Proof-of-Stake implementations, the transaction(s) may be hashed together by nodes 112 that hold a certain number or value of tokens 103 (thereby proving their stake in the system).

Voting Transactions on the Blockchain

The blockchain based voting system 120 may include multiple wallets 121 each issued to a respective voter. For example, to decentralize talent discovery, users who wish to vote during a talent contest may be provided with a voter wallet 121 that electronically holds crypto-tokens (illustrated as tokens 103). Voters may vote for contestants by transferring a value of tokens 103 such as by submitting blockchain transactions that transfer tokens 103 for voting. In some instances, a single vote for a performer may cost an amount of value measured in tokens 103. In these instances, users may pay tokens 103 to vote and the winner of the talent contest may be determined based on the number of votes received. In some instances, the amount of tokens 103 transacted by the voter is used as a proxy for votes. In these instances, the winner of the talent contest may be determined based on the highest value of tokens 103 "spent" on that performer. This permits, for example, voters to spend as little or as many tokens 103 for a performer without having to pay a specific amount for a single vote. In either instance, voters may be limited in their votes (e.g., limited to a single or N vote maximum for a performer or limited to a maximum amount of tokens 103 for a performer) or may be unlimited (e.g., may vote for a performer any number of times or spend any amount of tokens 103 for a performer). The specific voting limits may be dictated by the smart contract, specified by a judge, and/or others.

The token issuer 104 may issue crypto-tokens (illustrated as tokens 103) to the user. The tokens 103 may be issued as part of an Initial Coin Offering ("ICO") for decentralized talent discovery and/or for other purposes. Each token 103 may be issued specifically for a talent contest or may be issued generally for use in all talent contests and other uses. The token issuer 104 may continue to issue new tokens 103 after the ICO. Voters and other users may acquire tokens 103 (which may be added to the user's wallet) in exchange for other units of value such as other cryptocurrencies, fiat currencies, etc. Tokens 103 may be acquired from the token issuer 104 and/or from secondary markets from other users.

The voter wallet 121 may be implemented within or as part of various other applications executing on a user device (not illustrated). For example, the voter wallet 121 may be implemented within applications such as those described in U.S. Pat. No. 9,311,393, entitled, "System and Method for Aggregating Artist-Specific Content," filed on Apr. 13, 2015 and issued on Apr. 21, 2016, the contents of which are hereby incorporated by reference in its entirety herein.

Tokens 103 as an Asset

In some implementations, instead of paying tokens 103 for the right to vote, voters may pay some other unit of value to vote and receive a token 103 based on the vote. In these implementations, the token 103 may represent a future interest in the success of the performer that the voter votes on. The future interest may include a portion of the prize pool for the winner(s) of the talent contest, a future product or service to be provided by the performer (such as a digital music album, movie tickets, exclusive events, etc.), a portion of time-limited or unlimited earnings of the performer, and/or other interest of the performer. In these implementations, the vote may be seen as an investment in the performer. As such, if the performer succeeds the value of the token 103 may increase. Thus, the more the voter commits votes to a performer, the more tokens 103 that the voter will receive. For example, if the voter spends $10 to vote for a performer, the voter may receive one token associated with the performer. If another voter spends $100 to vote for the performer, that voter may receive ten tokens associated with the performer. Because the value of an individual token 103 may increase if the performer succeeds (such as winning the talent contest or succeeding after the talent contest), the voter is incented to vote not only for their favorite performer but also strategically based on the performer's likelihood of success. This may engage voters more so than under legacy voting systems. In some implementations, the token 103 may be a non-fundable tokens with unique identifier that each will be able to claim unique offerings from a performer. For example, in an invention contest the first 10 backers may receive a unique handcrafted robot prototypes.

The token 103 may be specific for the performer or may be generic for all performers. If generic, then the token 103 may be burned (such as being transferred to a null wallet or other ways to burn cryptocurrency) if a performer does not win or otherwise to devalue the value of the interest in the performer.

Legacy Based Broadcasting

In an implementation, the legacy voting system 140 may tally legacy votes used by televised talent contests. For example, the legacy voting system 140 may account for telephone and text message voting systems used for these contests. The legacy voting system 140 may include a legacy voting sub-system 142 and legacy clients 144. The legacy voting sub-system 142 may receive the legacy votes from the legacy clients 144 (which may include legacy devices used to generate legacy votes made through, for example, telephone calls and text messages) and process these votes separately from the blockchain based votes described herein. For example, the legacy voting sub-system 142 may tally votes for each performer separately from the blockchain based voting. In these implementations, a legacy vote may count equally the same as a blockchain based vote for purposes of determining a winner. In other implementations, the legacy vote may count differently. In some implementations, a legacy vote will not inure the same benefit to a legacy voter as a blockchain based voter. This is because the legacy voter does not use a wallet to track crypto-tokens.

In some implementations, the legacy voting sub-system 142 may count the legacy votes together with the blockchain based votes. For instance, the legacy voting sub-system 142 may generate blockchain transactions that exchange currency used to pay for legacy votes for tokens 103 and spend the tokens 103 to convert a legacy vote to a blockchain based vote. To do so, the legacy voting sub-system 142 may itself have a wallet that can be used to make such transfers.

Figure 3:
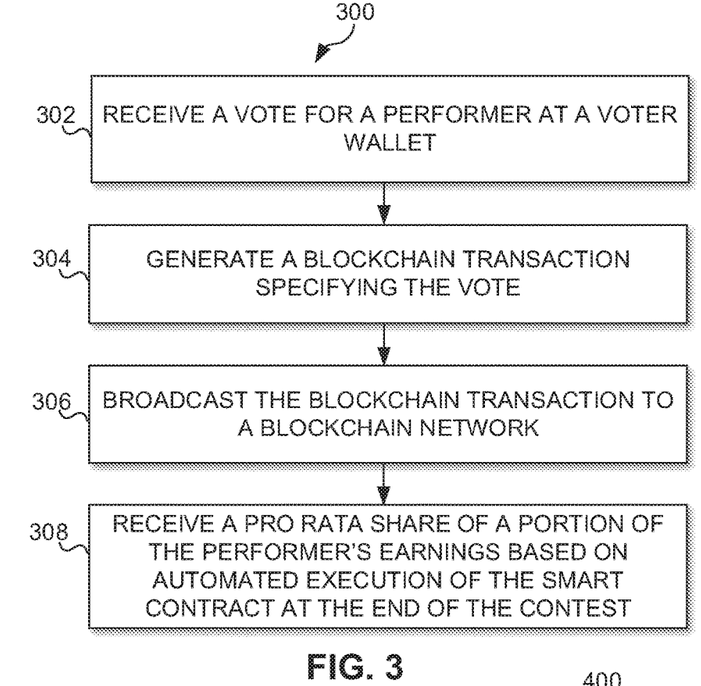
FIG. 3 illustrates an example of a process for voting for a performer using tokens, according to an implementation of the invention.

FIG. 3 illustrates an example of a process 300 for voting for a performer using tokens 103, according to an implementation of the invention. In an operation 302, process 300 may include receiving a vote for a performer. For example, a voter wallet 121 may receive the vote from a user that provides the vote via a content interface executed by a device that also executes the voter wallet.

In an operation 304, process 300 may include generating a blockchain transaction that specifies the vote. The blockchain transaction may include an amount of token 103 to transfer in exchange for the vote(s) and/or may include an amount of token 103 to pledge for the performer.

In an operation 306, process 300 may include broadcasting the blockchain transaction to the blockchain network 110. In an operation 308, process 300 may include receiving a pro rata share of a portion of the performer's earnings at the end of the contest (and/or afterward) based on automated execution of the smart contract 101. For example, the voter may be rewarded for voting for the performer.

Figure 4:
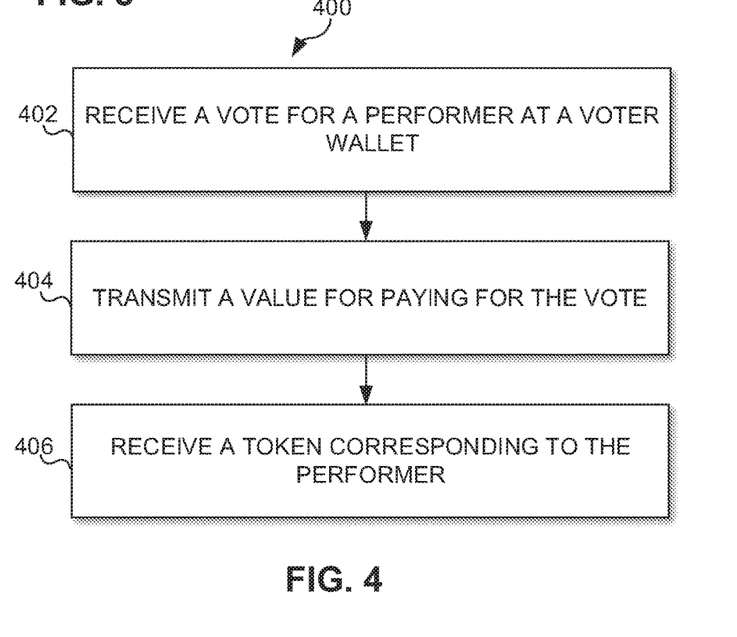
FIG. 4 illustrates an example of a process voting for a performer and obtaining a token as a future interest in exchange for the vote, according to an implementation of the invention.

FIG. 4 illustrates an example of a process 400 for voting for a performer and obtaining a token 103 as a future interest in exchange for the vote, according to an implementation of the invention. In an operation 402, process 400 may include receiving a vote for a performer. In an operation 404, process 400 may include transmitting a value (a payment) to pay for the vote. In some instances, votes may be free of charge but will not inure any benefit to the voter other than to help a performer win the talent contest.

In an operation 406, process 400 may include receiving a value of token 103 that represents a future interest in the performer. The amount of future interest may depend on the payment for the vote. For instance, a voter who votes 10 times for a performer will receive 10 times the amount of future interest than another voter who only voted one time for the performer. Likewise a voter who pledges 10 times as many tokens 103 for a performer will receive 10 times the amount of future interest than another voter who only pledged one token for the performer.

FIG. 5 illustrates an example of a contest interface 500 for viewing and voting for a performer in a blockchain based voting system, according to an implementation of the invention. The contest interface 500 (and content interfaces 600, 700 disclosed in FIGS. 6 and 7) may execute and be provided from a client device of a voter. In some instances, the contest interface 500 is part of an application executing on the client device, such as an application described in U.S. Pat. No. 9,311,393, which was previously incorporated by reference. In some instances, the contest interface 500 (and content interfaces 600, 700) is part of the voter wallet 121.

The contest interface 500 may include a performance viewing region 501. The performance viewing region 501 may display the performance of a performer competing in the talent contest. As such, the performance viewing region 501 may present audio, video, and/or other content of the performer 503. It should be noted that the performer may record/stream his performance using his own client device, which may execute its own version of the applications executing at the client device. Alternatively or additionally, the performance may be record in a traditional studio or other recording method. The content interface 500 may include a voting display 505 for voting for a performer 503. This voting display may enable voting by number of votes, number of tokens 103, and/or other method of voting.

In some instances, when the voter submits a vote through the voting display 505, the voter wallet 121 may generate and broadcast a blockchain transaction having one or more messages (or payload) that indicates: an identity of the performer 503 voted for, an identity of the talent contest, a value such as token 103 used for voting, and/or other information. The transaction may be validated and processed using the smart contract 101 relevant to the talent contest and written to the distributed ledger as a voting block 132.

FIG. 6 illustrates an example of a contest interface 600 for viewing and voting for a performer in a legacy based voting system, according to an implementation of the invention.

The contest interface 600 may include a performance viewing region 601. The performance viewing region 601 may correspond to a television or other conventional display used by conventional talent contests. The contest interface 600 may display voting instructions 603 for voting for a particular performer.

In some instances, when the voter submits a vote by following instructions 603, such as via telephone or text message, the legacy sub-system 142 may obtain an identity of the corresponding talent contest and generate and broadcast the transaction, much like the wallet 121 would ordinarily do. As such, the legacy sub-system 142 may hold its own wallet for this purpose, so that the votes may be registered on the decentralized ledger while enabling users to vote via legacy voting systems 140. In this way, a hybrid voting system may be adopted, one in which uses the blockchain based voting disclosed herein and incorporating legacy voting (e.g., via telephone or SMS text message).

FIG. 7 illustrates an example of a contest interface 700 for viewing and voting for a performer augmented with judge 702 or other user reactions 704 and automated sentiment analysis, according to an implementation of the invention. The contest interface 700 is similar to the content interface 500 except that in this implementation, a judge or user reaction portion 701 is provided. The judge or user reaction portion 701 may include an image 702 (such as a video, image, audio, etc.) of the judge. The image 702 may be played contemporaneously with playback (or streaming) of the performer. In this manner, viewers, such as potential voters, may view the reaction of the judge or other users in real-time via 702. In some instances, the judge or user reaction portion 701 may include an sentiment indicator 704. The sentiment indicator 704 may include an automatically generated indication of the sentiment of the judge or other user at the time of viewing a contemporaneous portion of the performance. The automatically generated sentiment may be based on automated facial, aural, biometric, or other analysis of the judge or other user.

In some instances, the sentiment indicator 704 may include a manually generated indication of the sentiment. For example, a judge's viewing interface for viewing the performance may include manually input options (such as emojis or score) for conveying the judge's sentiment regarding the performance at a given time and/or for the overall performance. It should be noted that the judge's viewing interface may capture the image of the judge for playback to the viewer in the judge or user reaction portion 701.

In some instances, the voter may select from among various user reactions when reviewing the performance of a performer. For example, various celebrities and others may offer to provide their reactions to performances. These users may be compensated for this offer. Such compensation may include compensation disclosed herein. For these users, the system may record the reactions for selection by voters. In this way, a voter may select their favorite celebrity and/or other user(s) to view their reaction(s) to the performance.

Third Party Sponsors

In some implementations, third party sponsors, such as advertisers, may provide sponsorships to support a talent contest. In some instances, the sponsors may provide the funds directly to the judge(s) and/or the system. In some instances, the sponsors may operate a sponsor wallet, in which case the sponsors may obtain and transfer tokens 103 to a particular talent contest (similar to the way in which a voter may pledge tokens). Whether or not through a sponsor wallet, any funds from the sponsor may be distributed based on the terms of the smart contract. For example, sponsorship funds may be directed to the prize pool, the judge(s), the performers, the voters, and/or others.

Figure 8:
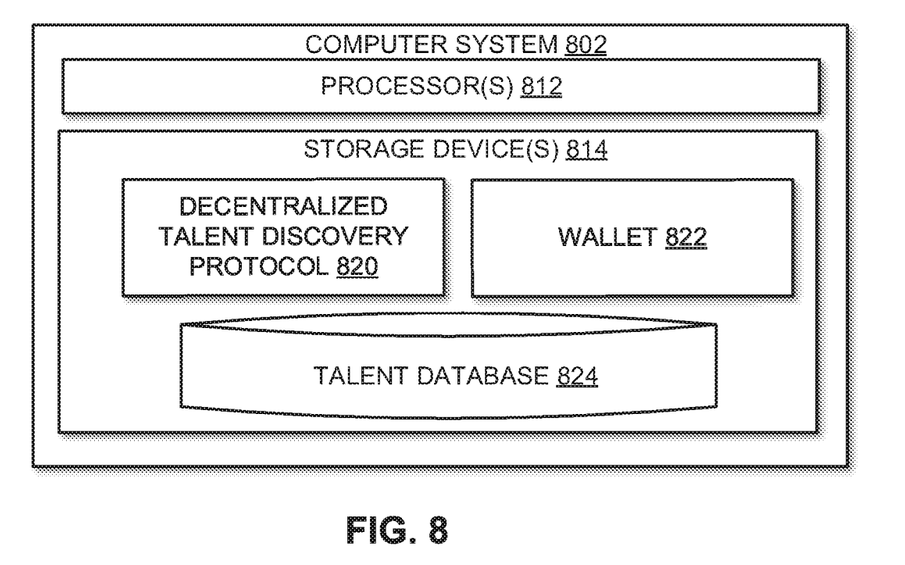
FIG. 8 illustrates an example of a computer system, according to an implementation of the invention.

FIG. 8 illustrates an example of a computer system 802, according to an implementation of the invention. The various devices (such as the nodes 112, talent system 102, user device executing the various wallets and contest interfaces, token issuer 104, legacy sub-system 142, etc.) disclosed herein may be implemented on a computer system 802. The computer system 802 may include one or more processors 812 programmed by one or more computer program instructions, which may be stored on a storage device 814 of the computer system. For instance, the processors 812 may be programmed by various components of the decentralized talent discovery protocol 820, a wallet 822 (which may correspond to any of the wallets disclosed herein), and/or other components. The computer system 802 may include a talent database 824, which may provide off-blockchain storage for various data and associations described herein.

In some instances, instead of or in addition to a per voting token fee model, the system may use a one-time token acquisition model in which a number of tokens 103 must be acquired in order to vote. In some of these instances, a voter with sufficient number of tokens 103, as specified and verified via the smart contract 101, may be permitted to vote for a performer (which may or may not be capped for a given talent contest).

Furthermore, instead of or in addition to a single blockchain (decentralized ledger 130), multiple decentralized ledgers 130 may be created, one for each talent contest. In these implementations, the talent system 102 may keep track of which decentralized ledgers 130 is associated with a given talent contest. Thus, when supplying various contest displays, the talent system 102 may provide the appropriate talent contest identifier such that votes may be directed to the proper decentralized ledger 130.

Some descriptions of tokens 103 may describe a value of the token in terms of units or numbers of tokens. It should be noted that any such description is not intended to mean an integer number. Rather, a number or value of tokens 103 may relate to a fraction, a measure of value in another currency such as fiat currency, and/or other quantification of value.

The one or more processors 812 may each include one or more physical processors that are programmed by computer program instructions. The various instructions described herein are exemplary only. Other configurations and numbers of instructions may be used, so long as the processor(s) 812 are each programmed to perform the functions described herein.

Furthermore, it should be appreciated that although the various instructions are illustrated in FIG. 8 as being co-located within a single processing unit, in implementations in which processor(s) 812 may each include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 812 may each be programmed by one or more additional instructions that may perform some or all of the functionality attributed herein to one of the instructions.

The various instructions described herein may be stored in each of a storage device 14, 24, 34, and 44, which may comprise random access memory (RAM), read only memory (ROM), and/or other memory. The storage device may store the computer program instructions (e.g., the aforementioned instructions) to be executed by processor(s) 812 as well as data that may be manipulated by processor(s) 812. The storage device 814 may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The various components illustrated in the Figures may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in the drawing figures are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system of conducting a decentralized talent discovery event via a blockchain network, the system comprising:
   a distributed ledger to be distributed across a plurality of nodes in the blockchain network; and
   a node comprising:
      a local copy of a distributed ledger that is copied across a plurality of nodes in the blockchain network; and
      a processor programmed to:
         receive votes from voters, wherein each vote corresponds to a respective contestant and requires a value of a token used by the blockchain network to be charged to a respective voter in exchange for the respective voter to place a vote;
         record each of the votes on the distributed ledger;
         cause each value of the token to be transferred from a wallet of the respective voter and added to a token pool based on the received vote, wherein at least a portion of the token pool is awarded to a winner of the decentralized talent discovery event;
         determine a winning contestant based on the received votes; and
         allocate at least a first portion of the token pool to the winning contestant and at least a second portion of the token pool to a subset of the voters that voted for the winning contestant.

2. The system of claim 1, wherein the processor is further programmed to:
   receive an initiation of the decentralized talent discovery event from an organizing user that selects the contestants; and
   generate the distributed ledger for the decentralized talent discovery event based on the received initiation.

3. The system of claim 2, wherein the processor is further programmed to:
   allocate at least a third portion of the token pool to the organizing user.

4. The system of claim 3, wherein the organizing user, the contestant, and each of the voters are each provided with a private key for use in blockchain transactions associated with the decentralized talent discovery event.

5. The system of claim 4, wherein to allocate the first portion of the token pool to the winning contestant, the processor is programmed to allocate the first portion to a blockchain account associated with a first blockchain wallet that is associated with the first private key of the winning contestant.

6. The system of claim 1, wherein the processor is further programmed to:
generate a second type of token associated with the winning contestant, the second type of token representative of a future earning of the winning contestant;
allocate a first value of the second type of token to the voters that voted for the winning contestant; and
allocate a second value of the second type of token to the winning contestant.

7. The system of claim 6, wherein the processor is further programmed to:
allocate a third value of the second type of token to the organizing user.

8. The system of claim 6, wherein the second type of token is made available on a secondary exchange to be traded after a predefined amount of time has elapsed.

9. The system of claim 1, wherein to receive the votes from the voters, the processor is programmed to:
receive blockchain transactions from respective blockchain wallets associated with each voter;
verify that each voter digitally signed a respective blockchain transaction comprising the vote; and
validate the blockchain transactions based on the verification.

10. The system of claim 1, wherein to allocate the first portion and the second portion, the processor is programmed to:
consult a smart contract that encodes logic at least to allocate the token pool; and
automatically execute the logic of the smart contract to automatically allocate the first portion and the second portion.

11. A method of conducting a decentralized talent discovery event via a blockchain network, the method comprising:
receiving, by a processor, votes from voters, wherein each vote corresponds to a respective contestant and requires a value of a token used by the blockchain network to be charged to a respective voter in exchange for the respective voter to place a vote;
recording, by the processor, each of the votes on a distributed ledger;
causing, by the processor, each value of the token to be transferred from a wallet of the respective voter and added to a token pool based on the received vote wherein at least a portion of the token pool is awarded to a winner of the decentralized talent discovery event;
determining, by the processor, a winning contestant based on the received votes; and
allocating, by the processor, at least a first portion of the token pool to the winning contestant and at least a second portion of the token pool to a subset of the voters that voted for the winning contestant.

12. The method of claim 11, further comprising:
receiving an initiation of the decentralized talent discovery event from an organizing user that selects the contestants; and
generating the distributed ledger for the decentralized talent discovery event based on the received initiation.

13. The method of claim 12, further comprising:
allocating at least a third portion of the token pool to the organizing user.

14. The method of claim 13, wherein the organizing user, the contestant, and each of the voters are each provided with a private key for use in blockchain transactions associated with the decentralized talent discovery event.

15. The method of claim 14, wherein allocating the first portion of the token pool to the winning contestant comprises allocating the first portion to a blockchain account associated with a first blockchain wallet that is associated with the first private key of the winning contestant.

16. The method of claim 11, further comprising:
generating a second type of token associated with the winning contestant, the second type of token representative of a future earning of the winning contestant;
allocating a first value of the second type of token to the voters that voted for the winning contestant; and
allocating a second value of the second type of token to the winning contestant.

17. The method of claim 16, further comprising:
allocating a third value of the second type of token to the organizing user.

18. The method of claim 16, wherein the second type of token is made available on a secondary exchange to be traded after a predefined amount of time has elapsed.

19. The method of claim 11, wherein receiving the votes from the voters comprises:
receiving blockchain transactions from respective blockchain wallets associated with each voter;
verifying that each voter digitally signed a respective blockchain transaction comprising the vote; and
validating the blockchain transactions based on the verification.

20. The system of claim 11, wherein allocating the first portion and the second portion comprises:
consulting a smart contract that encodes logic at least to allocate the token pool; and
automatically executing the logic of the smart contract to automatically allocate the first portion and the second portion.

* * * * *